United States Patent Office 3,684,531
Patented Aug. 15, 1972

3,684,531
METHOD FOR PROCESSING EGGS
Robert D. Foster, 202 Womble, Camden, Ark. 71701
No Drawing. Continuation-in-part of application Ser. No. 846,218, July 30, 1969. This application May 4, 1970, Ser. No. 34,525
Int. Cl. A23b 3/06
U.S. Cl. 99—196
10 Claims

ABSTRACT OF THE DISCLOSURE

A method for processing hard cooked eggs preparatory to packing, shipment and sale which includes the steps of initially hard cooking the eggs by contact with boiling water, then chilling the eggs to a temperature of from about 20° F. to about 80° F. The eggs are then moved into a cold zone where they are maintained at a temperature which is preferably below 0° F. for a period sufficient to freeze the egg from the shell inwardly for a distance of up to about ¼ inch. While the membrane or white is maintained in the peripherally frozen state described, the eggs are moved into a mechanical vibrator or cracking structure which cracks the shells of the eggs over the entire external periphery of the egg. The eggs are then moved to a shell removal zone where a liquid is jetted against the cracked shell to remove the shell from the egg. Preferably, a saline solution containing 25 to 30 weight percent salt, or a chlorinated solution is utilized for the shell removal step. Following removal of the shell, the eggs may be pickled or placed in any suitable preservative for canning or storage and shipment.

RELATED APPLICATION

This application is a continuation-in-part of my patent application Ser. No. 846,218 filed July 30, 1969 and now abandoned.

BACKGROUND OF THE INVENTION

Field of the invention

This invention relates to the processing of eggs for storage and shipment, and more specifically, to the preparation of shell-less hard cooked eggs for packing and shipment.

Brief description of the prior art

The factors making it desirable to provide shell-less hard cooked eggs for the market place are described in Koonz et al. U.S. Pat. 3,216,828. This patent proposes a method for processing eggs in order to hard cook the eggs and then remove the shells therefrom in order that they may be packed for shipment and marketing in a ready-to-eat state. In the Koonz et al. method, the ease with which the shells can be removed from eggs which have been hard cooked is stated to be greatly enhanced by artificially aging the eggs. This is accomplished by increasing the pH of the eggs to a level substantially above that which is characteristic of fresh eggs. When eggs are pre-aged in this manner prior to hard boiling, the patentees indicate that the shells are readily removable by several different techniques, including that of washing the shell off with a stream or spray of water.

At least two methods of increasing or raising the pH of the eggs prior to hard cooking are described in the Koonz patent, these being elevating the temperature of the eggs to between about 100 and 120° F. over a period of about twenty-four hours, or by exposing the eggs to contact with a basic material, such as ammonia, calcium hydroxide, etc. Both of these procedures involve the mechanism of withdrawing carbon dioxide from the interior of the egg through the egg shell so that the acidity of the egg is reduced and the pH therefore increased. The pantentees carry out the pre-aging by pH elevation prior to the hard cooking of the eggs, since they have found that coagulation of the egg albumen delays the loss of carbon dioxide from the interior of the egg through the shell.

BRIEF DESCRIPTION OF THE PRESENT INVENTION

The present invention comprises a process for preparing shell-less hard cooked eggs ready for packaging, or for immediate consumption, if desired. Broadly described, the method or process of the present invention comprises initially, and without pre-aging, hard cooking fresh eggs by the usual procedure of contacting them with hot or boiling water. When the eggs have been hard cooked, they are then cooled slowly to a temperature which is between about 20° F. and about 80° F. Preferably, the eggs are maintained at a temperature of about 30° F. for a period of ten minutes immediately following the hard cooking step. The cooled eggs are then subjected to a freezing step in which they are placed in a cold (freezing) environment having a temperature preferably below 0° F. and most preferably between about —50° F. and 0° F. They are maintained in this environment for a period of time sufficient to freeze at least the membrane between the shell and yolk or white of the egg, and in permissibly, the outer peripheral portion of the white of the egg to a depth extending radially inwardly from the shell of up to ¼ inch.

Following the freezing step in which the membrane or outer peripheral portion of the white is frozen solid, the eggs are immediately moved into a cracking step in which the shells of the eggs are thoroughly cracked over the entire periphery of the egg. Cracking may be accomplished in a cylindrical mechanical vibrator, or by other suitable means. It is important that the cracking be carried out while the membrane or peripheral portion of the white of the egg is in a frozen condition. The eggs are next moved from the cracking step into a shell removal step where the shells are removed by any suitable means, but preferably are removed by jetting a stream of liquid against the shells. Although it is not essential to the practice of the invention, it is preferable that the shell removal step be carried out while the membrane yet remains in the described frozen condition. After shell removal, the eggs may be treated with a preservative, immediately eaten, or may be packed by any of the now known packaging techniques.

I have found that the described procedure for processing hard cooked eggs for the removal of the shells therefrom permits a substantial increase in the efficiency of shell removal so that well above 90 percent of the eggs subjected to the process do not require manual further processing to remove bits of shell which have not been thoroughly removed in the course of the process. I consider it important that this high degree of efficiency in shell removal has been effected without any affirmative action to pre-age the eggs and, in fact, it is supposed that both the hard cooking of the eggs and the freezing of the membrane or perimeter of the albumen of the egg function to prevent or reduce loss of carbon dioxide from the egg, and thus prevent aging of the egg as a result of any significant increase in the pH thereof.

An object of the present invention is to provide a new and highly efficient procedure for automatically removing the shells from hard cooked eggs.

An additional object of the invention is to provide a process for hard cooking and shelling eggs in a rapid and economical manner, and through the use of equipment which does not require great capital investment and does not employ the use of noxious or harmful chemicals.

Another object of the invention is to provide a method for removing the shells from hard cooked eggs in a way which does not entail the deliberate aging of the egg in order to enhance the efficiency of shell removal.

Additional objects and advantages of the invention will become apparent as the following detailed description of the invention is considered.

DETAILED DESCRIPTION OF THE INVENTION

In practicing the process of the invention, the eggs which are to be treated are first hard cooked by any conventional and well known method. Generally, this will involve contacting the eggs with water having a temperature of from about 180° F. to 212° F. for a period of time which will depend, of course, on the temperature of the water, and the temperature of the eggs when they are first placed in the water. In any event, the hard cooking step forming a part of the process of the invention is well known per se, and no further details are believed necessary for its character to be well understood by those skilled in the art.

After the eggs have been hard cooked, they are cooled to a temperature of between 20° F. and 80° F. by placing them in a pre-cooling zone maintained at this temperature. This step is not essential or absolutely critical in the practice of the process of the present invention, but for reasons which are not entirely clear from a technical viewpoint, I find that the overall time within which the process can be performed is decreased when this cooling or pre-chilling step is included in the process. Moreover, within the range of temperatures described, i.e., from about 20° F. to about 80° F., I prefer to chill the eggs to a temperature of 30° F. by placing them in an environment of this temperature for a period of from about five to about fifteen minutes, and preferably for about ten minutes.

Having cooled the eggs in the manner described, they are then moved directly into a freezing zone in which the eggs are subjected to a freezing environmental temperature which is preferably below 0° F. and most preferably from about −50° F. to about 0° F. In general, the higher the temperature within this range, the longer is required to accomplish the freezing of the membrane between the shell and the albumen of the egg which is the object of this step of the process. It may be pointed out that this step of the process may freeze the outer periphery of the albumen of the egg to a depth of up to about ¼ inch as measured inwardly in a radial direction from the shell of the egg, and that the time that the egg is maintained within the described range of temperatures will be dictated by the ultimate requirement of freezing at least the membrane of the egg.

While the membrane and peripheral portion of the albumen of the egg remains frozen in the manner described, the egg is passed immediately to a cracking zone where the shell is thoroughly cracked over the entire outer periphery of the egg. In one method of cracking, the eggs are passed into the interior of a vibrating cylinder which effectively cracks the eggs by contact with the internal wall of the cylinder.

When cracking of the eggs has been completed in the described manner, and preferably before the membrane has thawed completely to the outer peripheral surface thereof, the cracked shells are removed from the outside of the egg by any suitable procedure. Preferably, the step of shell removal is carried out by jetting or spraying a saline aqueous solution against the cracked shells of the eggs. The saline solution contains from 25 to 30 weight percent salt. I have found that when this type of shell removal is employed, the salt in the saline solution delivers an abrasive action which aids in removing the cracked shells. The salinity also assists in sterilizing and cleaning the surface of the egg. Chlorinated water may also be utilized.

By the use of the described process of the invention, eggs may be very rapidly processed from the raw fresh state to the hard cooked shell-less state with very few rejects occurring at the end of the process as a result of incomplete removal of the shells. Moreover, the eggs are not aged in the course of the process and are more palatable in character than shell-less hard cooked eggs as prepared by some processes which have been heretofore known. The machinery and equipment required to carry out the process is relatively inexpensive in construction and reliable in operation.

Although a preferred embodiment of the invention has been herein described in order to apprise those skilled in the art of the manner in which the invention is to be practiced, it will be understood that some changes can be made in the process conditions and parameters without departure from the basic principles which underlie the invention. Changes and innovations of this type which continue to employ these basic principles are therefore deemed to be circumscribed within the spirit and scope of the invention.

What is claimed is:

1. A method for preparing shell-less hard cooked eggs comprising:
   hard cooking the eggs;
   freezing the outer peripheral portion of the egg interiorly of the shell so that the frozen outer peripheral portion extends inwardly from the shell for a distance of up to about ¼";
   cracking the shells of the eggs while said outer peripheral portion thereof remains frozen; then
   removing the cracked shells from the eggs.

2. The method defined in claim 1 and further characterized to include the step, after hard cooking of the eggs, of exposing the eggs to a temperature of 30° F. for a period of about ten minutes.

3. The method defined in claim 1 wherein the cracked shells are removed from the eggs by jetting saline water water against the eggs.

4. The method defined in claim 1 wherein the shells of the eggs are cracked by placing the eggs within a vibrating cylinder.

5. The method defined in claim 4 wherein prior to placing the eggs in said freezing zone, the eggs are first cooled from the temperature at which they are hard cooked by placing them in a pre-cooling zone having a temperature of from about 20° F. to about 80° F. until the eggs reach a temperature equivalent to the temperature of the pre-cooling zone.

6. The method defined in claim 5 wherein the said freezing zone has a temperature of about −50° F.

7. The method defined in claim 6 wherein the cracked shells are removed from the eggs by jetting saline water against the eggs.

8. The method defined in claim 1 wherein the frozen outer peripheral portion of the egg is the membrane between the shell and the albumen.

9. A method for preparing shell-less hard cooked eggs comprising:
   hard cooking the eggs;
   cooling the eggs after hard cooking from the temperature at which they are hard cooked by placing them in a pre-cooling zone having a temperature of from about 20° F. to about 80° F. until the eggs reach a temperature equivalent to the temperature of the pre-cooling zone;
   freezing the outer peripheral portions of the albumen of the eggs in a freezing zone having a temperature below about 0° F. to freeze a peripheral portion of the albumen of each egg to a depth of up to about ¼" as measured radially inwardly from the shell of the egg;

cracking the shells of the eggs while said outer peripheral portion thereof remains frozen; then
removing the cracked shells from the eggs.

10. A method for preparing shell-less hard cooked eggs comprising:
  hard cooking the eggs;
  freezing the outer peripheral portion of the eggs interiorly of the shell by placing the eggs in a freezing zone having a temperature below about 0° F.;
  cracking the shells of the eggs while said outer peripheral portion thereof remains frozen; then
  removing the cracked shells from the eggs.

References Cited
UNITED STATES PATENTS

| | | | |
|---|---|---|---|
| 3,216,828 | 11/1965 | Koonz | 99—113 |
| 2,912,335 | 11/1959 | Haller | 99—161 |
| 2,471,626 | 5/1949 | Kaloyereas | 99—196 |
| 3,510,315 | 5/1970 | Hawley | 99—113 |

NORMAN YUDKOFF, Primary Examiner

H. H. BERNSTEIN, Assistant Examiner

U.S. Cl. X.R.

99—113